United States Patent Office 3,113,808
Patented Dec. 10, 1963

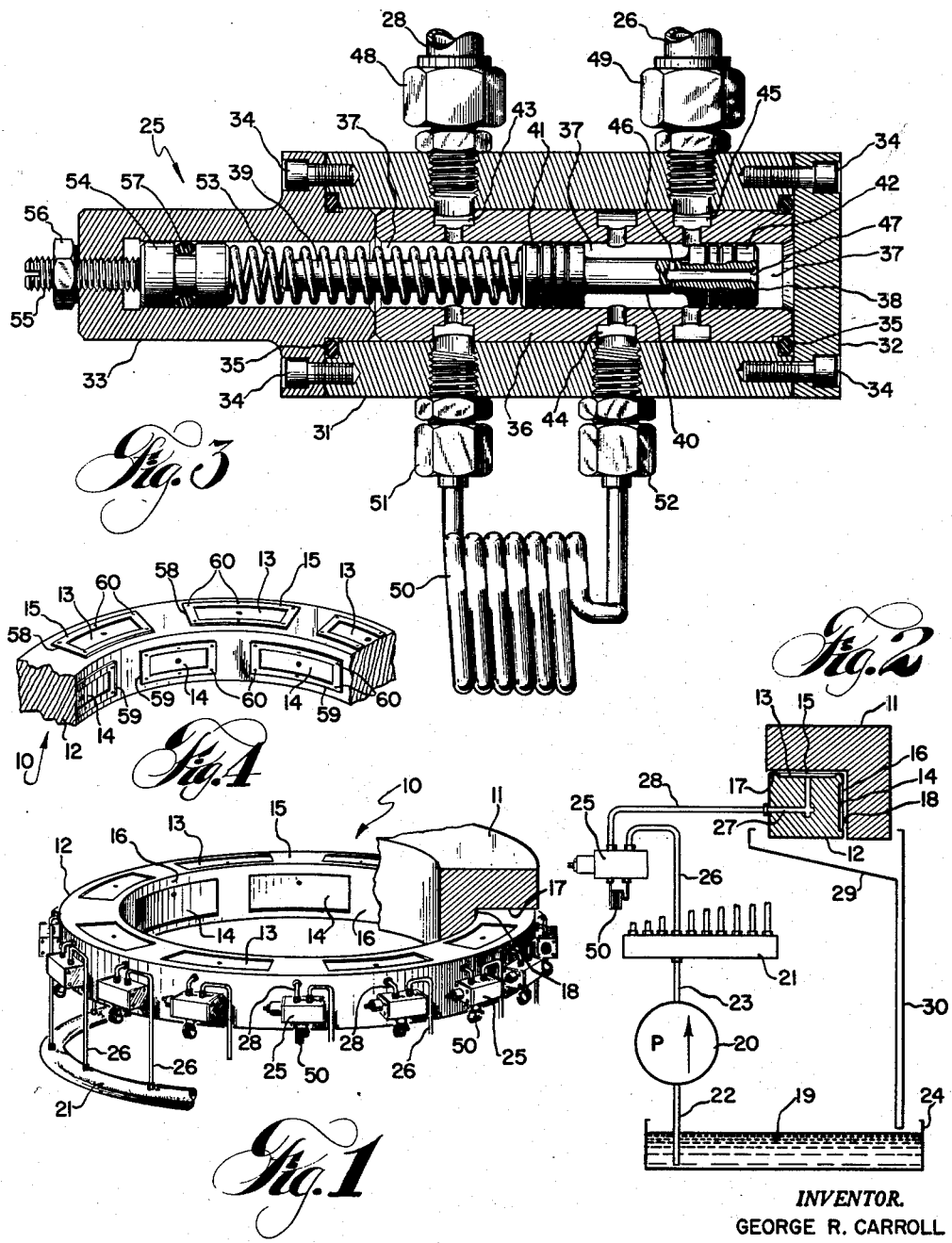

3,113,808
HYDRAULIC BEARING
George R. Carroll, Columbus, Ohio, assignor to North American Aviation, Inc.
Filed May 15, 1962, Ser. No. 194,771
4 Claims. (Cl. 308—9)

This invention concerns a hydraulic bearing and particularly relates to a hydraulic bearing having a hydraulic system with improved hydraulic fluid flow-control means provided therein.

An important object of this invention is to provide a hydraulic bearing which develops a constant hydraulic fluid film thickness as between runner surface and sill surface components of the bearing throughout changing operating conditions.

Another object of this invention is to provide a hydraulic bearing which develops a hydraulic fluid flow between runner surface and sill surface components of the bearing that is not affected by hydraulic system input or output pressure fluctuations.

Another object of this invention is to provide a hydraulic bearing with a hydraulic system fluid flow-control or metering means that develops compensation for hydraulic fluid viscosity changes caused by temperature variations to maintain a constant hydraulic fluid film thickness as between runner surface and sill surface components of a hydraulic bearing.

A still further object of this invention is to provide a hydraulic bearing which develops a constant hydraulic fluid film thickness as between runner surface and sill surface components of a hydraulic bearing during changing operating conditions and which has a minimum sensitivity to contamination.

Other objects and advantages of this invention will become apparent during consideration of the description and drawings.

In the drawings:

FIG. 1 is a perspective view of a bearing which incorporates the features of this invention;

FIG. 2 is a schematic illustration of the hydraulic system incorporated in the hydraulic bearing of FIG. 1;

FIG. 3 is a sectional view of the improved hydraulic fluid control or metering means incorporated in the hydraulic bearing of FIG. 1 and in the hydraulic system of FIG. 2; and FIG. 4 is a perspective view of a portion of another embodiment of the bearing of this invention.

The hydraulic bearing of this invention is designated generally by the reference numeral 10 of FIG. 1. Bearing 10 supports the base member shown as 11. In one application of this invention, base member 11 is part of the azimuth support of a large-diameter antenna having a gross weight in excess of 375,000 pounds. In that application, hydraulic bearing 10 is provided to develop precision support for the antenna structure as that structure is rotated in azimuth for tracking purposes. Hydraulic bearing 10 develops a resistance to rotation which is nil or negligible, maintains a constant hydraulic fluid film thickness as between the bearing and base member 11, and provides both thrust and radial position control.

Hydraulic bearing 10 includes a block 12 containing pool recesses 13 and 14. Pool recesses 13 are provided in the upper sill surface 15 of block 12 to develop thrust support for base member 11. Pool recesses 14 are provided in the vertical sill surface 16 of block 12 to develop radial position control for base member 11. Undersurface portions 17 and 18 of base member 11 cooperate with sill surfaces 15 and 16, respectively. However, surfaces 17 and 18 are separated from surfaces 15 and 16 by a film of hydraulic fluid having a constant thickness throughout changing operating conditions of loading pressures, viscosity, and temperature. In this description, surfaces 17 and 18 are referred to as runner surfaces.

During operation of the bearing system invention described herein, hydraulic bearing 10 and base member 11 are maintained in their respective operating positions by the hydraulic system disclosed schematically in FIG. 2. In that system, hydraulic fluid 19 is supplied to pool recesses 13 and 14 through the pump means 20 and through the manifold means 21. Hydraulic line portions 22 and 23 supply hydraulic fluid 19 from the fluid reservoir 24 to pump means 20 and from pump means 20 to manifold 21, respectively. Each pool recess 13 or 14 in hydraulic bearing 10 is supplied with pressurized hydraulic fluid through the improved flow-control valve 25 of this invention. Each flow-control valve 25 is operatively connected to manifold 21 by hydraulic line portion 26 and to an interior passageway 27 in block 12 by a hydraulic line portion such as 28. Each passageway 27 conducts fluid from a hydraulic line portion 28 to a pool recess 13 or to a pool recess 14. Hydraulic fluid flowing from between the block portion 12 of hydraulic bearing 10 and base member 11 is received in the sump designated 29 and returned to reservoir 24 through the fluid line designated 30.

Details of the improved hydraulic fluid flow-control or metering means 25 incorporated in this invention are provided in FIG. 3. The housing of flow-control means 25 includes a body portion 31 and end plates 32 and 33. End plate 33 differs from end plate 32 essentially in that it contains an adjustment means for varying the performance characteristic of the flow-control means. End plates 32 and 33 are secured to body 31 by the fasteners designated 34. The seal means designated 35 are provided for eliminating leakage as between the body and end plate portions of unit 25. Flow-control means 25 also includes the porting sleeve designated 36. Within the cylindrical interior chamber 37 defined by porting sleeve 36 is located a valve member referenced generally as 38. Valve member 38 includes stem portions 39 and 40 and spool portions 41 and 42. Spool portion 42 provides a throttling function and, in part at least, regulates the flow of hydraulic fluid through unit 25. Spool portion 41 is provided to maintain a constant pressure differential in the valve as hereinafter detailed. Porting sleeve 36 includes annular passageway and port combinations 43, 44, and 45. Interior intersecting passageways 46 and 47 are provided in valve member 38 in a manner whereby hydraulic fluid pressure is maintained at the same pressure level at either side of spool portion 42.

Hydraulic line portions 26 and 28 are operatively connected to flow-control means 25 by the fittings designated 48 and 49. Pressurized fluid received from pump means 20 passes into annular passageway 45 and is ported into that portion of interior chamber 37 located intermediate spool portions 41 and 42. Such fluid is also ported at the same pressure into the end portion of interior chamber 37 located adjacent spool 42 through the passageways designated 46 and 47. Pressurized fluid received in the chamber portion intermediate spools 41 and 42 is further ported to and from fixed-value capillary means 50 through the annular passageway-port combinations 44 and 43, respectively. Fixed-value capillary means 50 is connected to flow-control unit 25 by the conventional fittings designated 51 and 52. The pressurized fluid is afterward conducted from capillary means 50 into that portion of interior chamber 37 which is located to the left (FIG. 3) of spool 41 and thereafter into hydraulic line portion 28 supplying a pool recess in bearing 10. Capillary means 50 is subjected to a constant pressure differential by reason of the operation of balancing spool 41 and the fixed resistance value of the capillary tube portion.

Flow-control means 25 also incorporates a compression spring 53. Spring 53 surrounds stem portion 39, abuts spool portion 41, and also abuts the adjustment piston designated 54. Piston 54 is spaced-apart from the end of stem 39 to permit longitudinal movement of valve member 38 within its operating limits. Spring 53 is selected to provide a constant spring-loading throughout small displacements of valve 38. Such is especially true as to displacements of the left end (FIG. 3) of spool 42 across the port portions of combination 45. A slotted adjustment screw 55 and a locknut 56 are provided to facilitate adjustment of the position of piston 54. Seal means 57 is provided to prevent leakage of pressurized hydraulic fluid from within chamber 37 to the atmosphere through the threaded opening in end plate 33.

As shown in FIG. 4 of the drawings, it may be preferred that pool recesses 13 and 14 be provided in individual pad members 58 and 59 of given length and width which are separately attached to block 12 by fasteners 60. In this manner the bearing will be provided with separated sill surface portions that are each well-defined as to extent of surface area.

The hydraulic bearing and hydraulic system of this invention operate to maintain a constant film thickness as between the runner surfaces 17 and 18 of base member 11 and the sill surfaces 15 and 16 of bearing block 12 as pressurized fluid is circulated into and from pool recesses 13 and 14. The constant film thickness is maintained even though changes occur to the operating conditions of the hydraulic bearing and hydraulic fluid system. Such changes include variations in inlet pressure established by pump means 20, variations in outlet presure changed by the loading of base member 11, and variations in hydraulic fluid viscosity caused by temperature changes or the like. Such improved performance is obtained essentially through use of improved flow-control means 25 having the throttling and balancing spool valve 38 of uniform maximum cross-sectional diameter and the fixed-value capillary means designated 50. Performance of the system is such that flow-control means 25 is not readily subjected to malfunction because of typical fluid system contamination.

I claim:

1. In a hydraulic bearing having sill and runner surfaces separated by a film of pressurized hydraulic fluid of constant thickness, in combination: pump means delivering pressurized hydraulic fluid, and flow-control means metering the flow of pressurized hydraulic fluid delivered by said pump means to the hydraulic bearing, said flow-control means comprising a capillary means having a fixed-value flow resistance, and pressure-responsive valve means regulating the flow of fluid from said pump means to said capillary means, said valve means maintaining a constant pressure differential across said capillary means when pressure loadings of the bearing are changed and when pressure loadings of said pump means are changed.

2. The invention defined by claim 1, wherein said valve means includes a pressure-responsive balancing spool portion and a throttling spool portion spaced-apart from said balancing spool portion a fixed distance, said spool portions having equal cross-sectional areas.

3. A hydraulic bearing having a runner surface, a sill surface, pool means containing pressurized hydraulic fluid which separates said runner surface from said sill surface by a constant distance, pump means delivering pressurized hydraulic fluid, capillary means of fixed length compensating for viscosity changes in pressurized hydraulic fluid transmitted therethrough to said pool means, and valve means controlling the quantity of pressurized hydraulic fluid delivered by said pump means to said capillary means, said valve means developing a pressure drop of fixed-value across said capillary means during load changes to said runner surface and during load changes to said pump means.

4. The invention defined by claim 3, wherein said valve means includes a throttling valve which is longitudinally displaced to control the quantity of pressurized hydraulic fluid delivered to said capillary means and includes a balancing valve movably responsive to changes in the pressure differences between inlet hydraulic fluid and outlet hydraulic fluid pressures for said capillary means, said throttling valve being connected in fixed spaced-apart relation to and having the same cross-sectional areas as said balancing valve.

References Cited in the file of this patent

UNITED STATES PATENTS

| | | |
|---|---|---|
| 1,906,715 | Penick | May 2, 1933 |
| 2,578,712 | Martellotti | Dec. 18, 1951 |
| 2,617,696 | Honiss | Nov. 11, 1952 |
| 2,760,832 | Bidwell | Aug. 28, 1956 |
| 2,938,756 | Loeb | May 31, 1960 |